(12) United States Patent
Zhang

(10) Patent No.: US 8,414,316 B2
(45) Date of Patent: Apr. 9, 2013

(54) ELECTRICAL CARD CONNECTOR HAVING IMPROVED SPRING MEMBER

(75) Inventor: Wei-De Zhang, Shenzhen (CN)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 0 days.

(21) Appl. No.: 13/187,513

(22) Filed: Jul. 21, 2011

(65) Prior Publication Data
US 2012/0021626 A1    Jan. 26, 2012

(30) Foreign Application Priority Data

Jul. 21, 2010   (CN) .......................... 2010 2 0265937

(51) Int. Cl.
*H01R 13/62* (2006.01)
(52) U.S. Cl.
USPC .......................................................... 439/159
(58) Field of Classification Search .................. 439/157, 439/153, 159, 152
See application file for complete search history.

(56) References Cited

U.S. PATENT DOCUMENTS

| | | | |
|---|---|---|---|
| 7,070,430 B2 * | 7/2006 | Yang et al. ..................... | 439/159 |
| 7,198,498 B2 * | 4/2007 | Miyamoto .................... | 439/159 |
| 7,278,866 B1 * | 10/2007 | Van der Steen ............... | 439/159 |
| 7,402,079 B2 | 7/2008 | Yang | |
| 7,435,115 B2 * | 10/2008 | Kiryu et al. .................... | 439/159 |
| 7,484,976 B2 * | 2/2009 | Ezaki ............................. | 439/159 |
| 7,637,759 B2 * | 12/2009 | Kobayashi et al. ........... | 439/159 |
| 7,819,678 B2 * | 10/2010 | Ye et al. ......................... | 439/159 |

FOREIGN PATENT DOCUMENTS

TW           M335820            7/2008

\* cited by examiner

*Primary Examiner* — Felix O Figueroa
(74) *Attorney, Agent, or Firm* — Wei Te Chung; Ming Chieh Chang

(57) ABSTRACT

An electrical card connector (100) includes an insulating housing (1), a plurality of terminals (2) received in the insulating housing (1), an ejector (4) including a slider (40) and a pin member (42), and a metal shield (3) shielding the insulating housing (1) to define a card receiving space (6). The slider (40) is moveable relative to the housing (1) along a front-to-back direction under a controlled movement of the pin member (42). The metal shield (3) comprises a flat portion (30) over the insulating housing (1) and a pair of sidewalls (32) extending downwardly from the flat portion (30). The flat portion (30) defines a first spring arm (35) extending rearwardly into the card receiving space (6) and a second spring arm (36) extending forwardly into the card receiving space (6) for abutting against the pin member (42).

18 Claims, 4 Drawing Sheets

ELECTRICAL CARD CONNECTOR HAVING IMPROVED SPRING MEMBER

BACKGROUND OF THE INVENTION

1. Field of the Invention

The present invention relates generally to electrical card connectors, and more particularly to an electrical card connector having an ejector in the card receiving space.

2. Description of Related Arts

Nowadays, electrical card connectors are widely used in computers, mobile phones, cameras, etc. to receive an electrical card. The electrical card presents as a media for storing and transmitting data to and from the computers, mobile phones, cameras or the like.

Taiwan Patent No. M335820 discloses an electrical card connector comprising an insulating housing, a shield shielding over the insulating housing for defining a card receiving space, a plurality of terminals received in the insulating housing, and an ejector retained in the insulating housing. The ejector comprises a slider with a heart-shaped recess, a spring, and a pin member with one end received in the heart-shaped recess of the slider. The shield defines a spring member for abutting against the pin member. However, during the insertion/ejection of the card, the spring member may not always stably press the moving pin member. In worst case, the pin member may escape or jump out of the heart-shaped recess.

Hence, an electrical card connector that has a pin member stably engaging the heart-shaped recess is desired.

SUMMARY OF THE INVENTION

Accordingly, an object of the present invention is to provide an electrical card connector always prevents the pin member from jumping out of the heart-shaped recess.

To achieve the above object, an electrical card connector includes an insulating housing, a plurality of terminals received in the insulating housing, an ejector including a slider and a pin member, and a metal shield shielding the insulating housing to define a card receiving space. The slider is moveable relative to the housing along a front-to-back direction under a controlled movement of the pin member. The metal shield comprises a flat portion over the insulating housing and a pair of sidewalls extending downwardly from the flat portion. The flat portion defines a first spring arm extending rearwardly into the card receiving space and a second spring arm extending forwardly into the card receiving space for abutting against the pin member.

Other objects, advantages and novel features of the invention will become more apparent from the following detailed description when taken in conjunction with the accompanying drawings.

DETAILED DESCRIPTION OF THE PREFERRED EMBODIMENT

Figure 1:
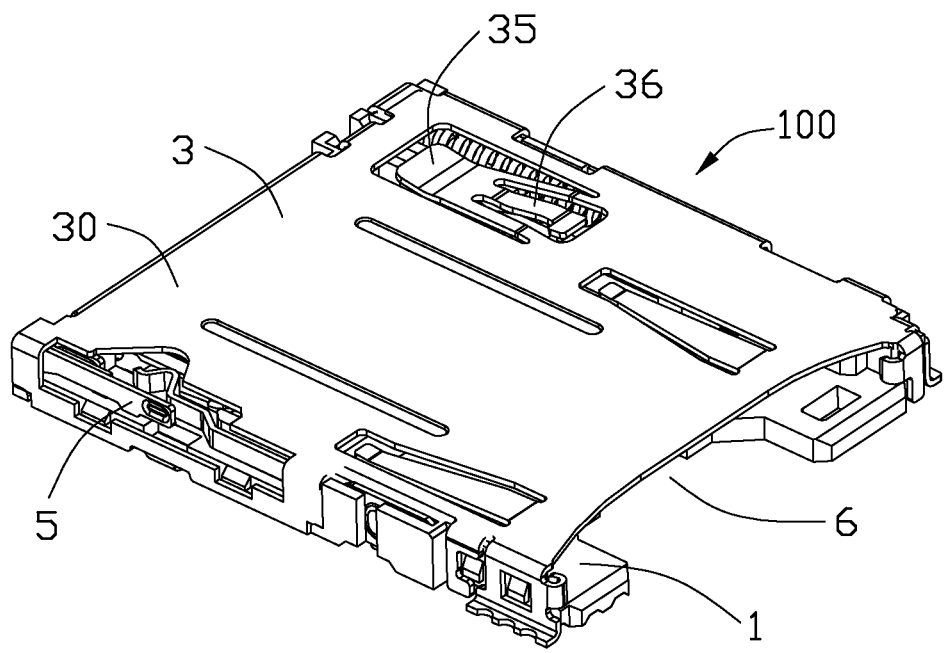
FIG. 1 is a perspective, assembled view of an electrical card connector according to the present invention.

FIGS. 1-4 illustrate an electrical card connector 100 in accordance with the present invention. The electrical card connector 100 includes an insulating housing 1, a plurality of terminals 2, an ejector 4, a switch element 5, and a metal shield 3 assembled on and shielding the insulating housing 1 for defining a card receiving space 6. The terminals 2, the ejector 4 and the switch element 5 are all received in the insulating housing 1.

Figure 2:
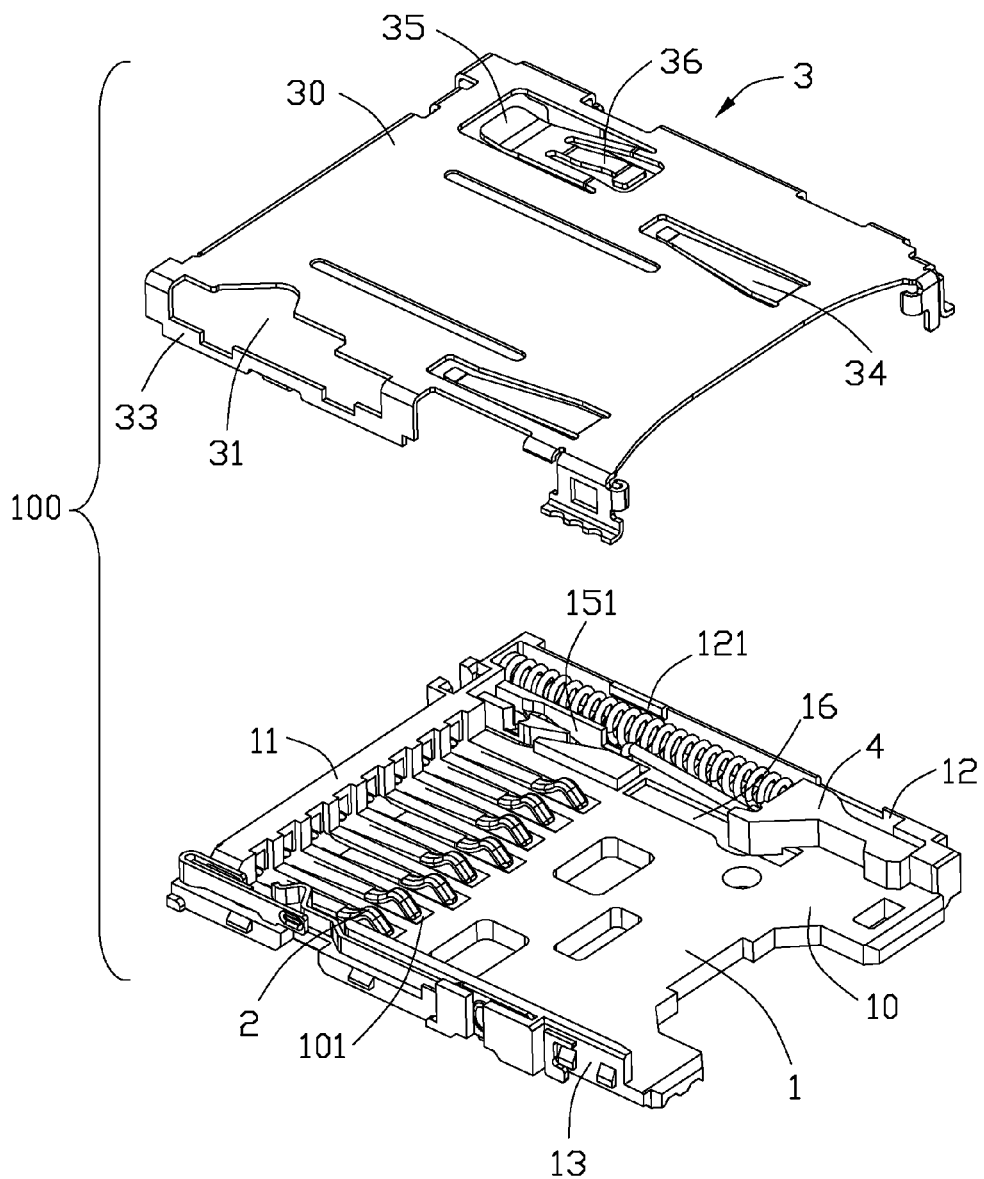
FIG. 2 is a perspective, partly assembled view of an electrical card connector according to the present invention.
Figure 3:
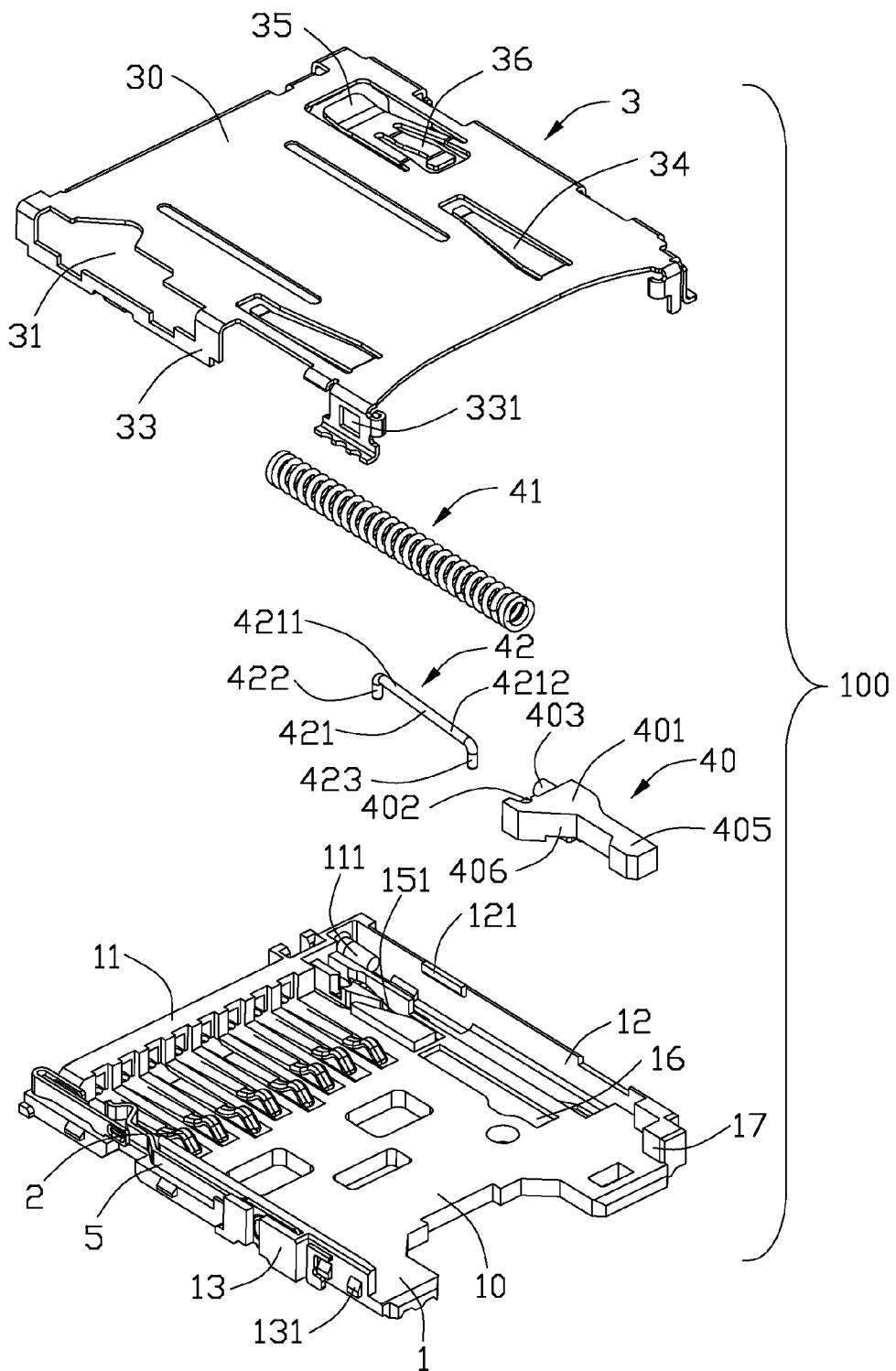
FIG. 3 is a perspective, exploded view of the electrical card connector.

Referring to FIGS. 2-3, the insulating housing 1 comprises a base portion 10, a first arm portion 13 and a second arm portion 12 extending upwardly from two sides of the base portion 10, and a transversal wall 11 extending upwardly from a rear end of the base portion 10. Each of the first arm portion 13 and the second arm portion 12 forms a plurality of protrusions 131 extending outwardly from two sides thereof to engage with the metal shield 3. The base portion 10 further defines a plurality of terminal receiving passageways (not labeled) for receiving the terminals 2. The transversal wall 11 forms a first post 111 extending forwardly adjacent to the second arm portion 12. The base portion 10 defines a heart-shaped recess 151 recessed downwardly from a top surface thereof and located beside the first post 111, and a guiding slot 16 located in front of the heart-shaped recess 151 and extending along a front-to-back direction.

Figure 4:
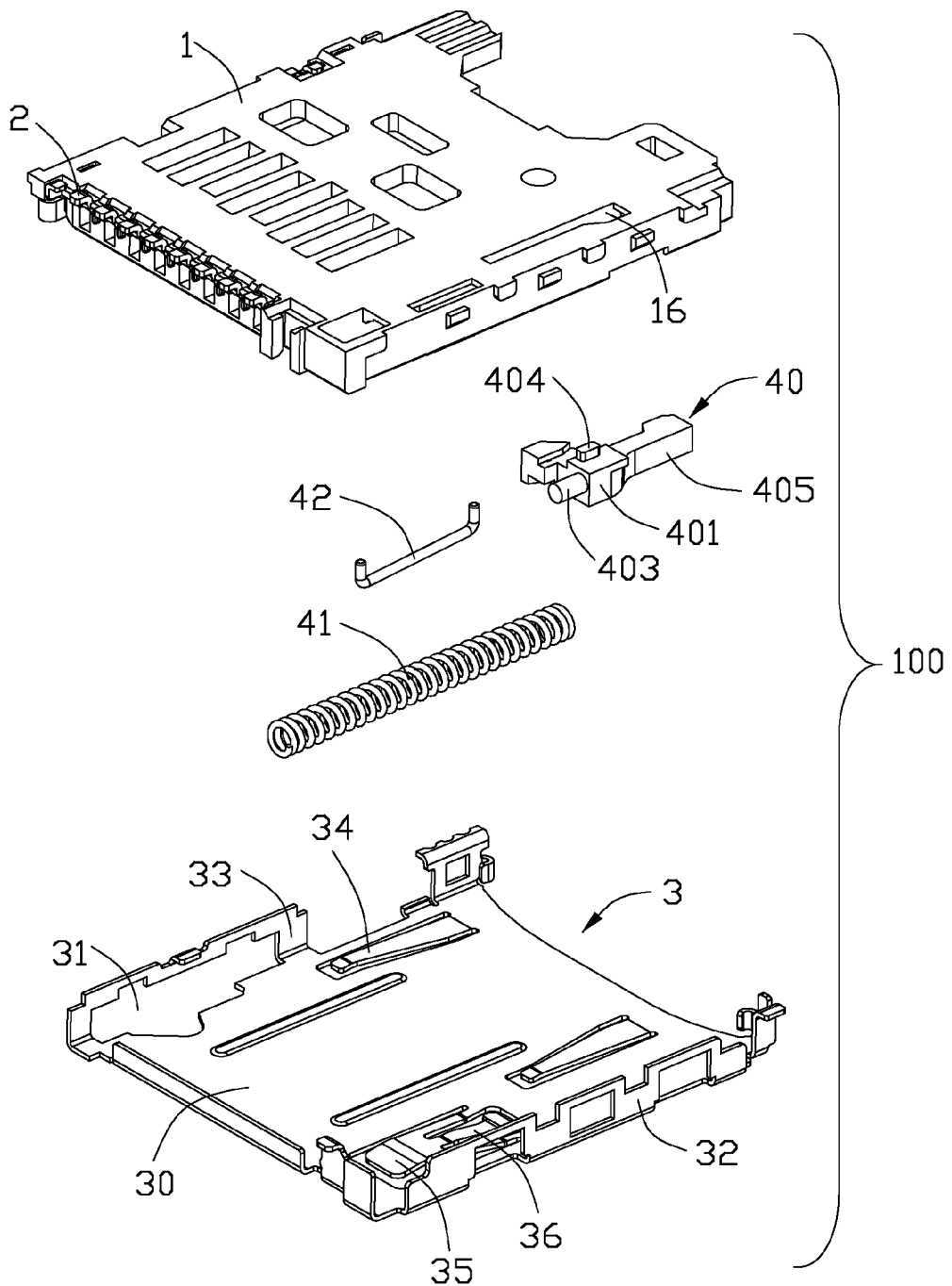
FIG. 4 is another perspective, exploded view of the electrical connector.

Referring to FIGS. 2-4, the ejector 4 includes a spring-biased slider 40 and a pin member 42, and in the preferred embodiment the slider 40 is biased by a spring 41. The slider 40 is moveable relative to the guiding slot 16 along a front-to-back direction via a controlled movement of the pin member 42 along the heart-shaped recess 151 with assistance of the spring 41.

The slider 40 comprises a base 401, a second post 403 extending backwardly from a rear end of the base 401 towards the first post 111, a positioning hole 402 recessed downwardly from a top surface of the base 401 beside the second post 403, a guiding portion 404 protruding downwardly from a bottom surface of the base 401, and a locking arm 405 extending forwardly from a front end of the base 401. The guiding portion 404 moves in the guiding slot 16 to guide the slider 40 moving along a front-to-back direction. The base 401 defines an inclined surface 406 in the front end thereof, and the inclined surface 406 could abut against an inserted card along an oblique direction.

The spring 41 extends along the card's insertion/ejection direction and is positioned between the second post 403 and the first post 111. The second sidewall 12 forms a protrusion 121 protruding to the card receiving space 6 from a top thereof for preventing the spring 41 from warping up or buckling.

The pin member 42 has a main portion 421 defining a rear portion 4211 and a front portion 4212 extending forwardly from the rear portion 4211, a first fixing portion 422 bending downwardly from the free end of the rear portion 421 and movably received in the heart-shaped recess 151, and a second fixing portion 423 bending downwardly from the free end of the front portion 4212 and fixed in the positioning hole 402.

Referring to FIGS. 3-4, the metal shield 3 comprises a flat portion 30, a first sidewall 33 and a second sidewall 32 extending downwardly from two edges of the flat portion 30. The first sidewall 33 and the second sidewall 32 define a plurality of locking holes 331 to lock with the protrusions 131. Adjacent to the second sidewall 32, the flat portion 30 forms a first spring arm 35 extending backwardly into the card receiving space 6 and a second spring arm 36 extending forwardly into the card receiving space 6 for abutting against the pin member 42. In the longitudinal direction, the root of the second spring arm 36 is located in the middle area of the first spring arm 35, i.e., the free end of the second spring arm 36 is located adjacent to the root of the first spring arm 35.

Since the second spring arm 36 is essentially formed in (or on or within) the first spring arm 35, in the transversal direction, the first spring arm 35 is wider than the second spring arm 36. The first spring arm 35 and the second spring arm 36 are generally aligned along the longitudinal direction. The flat portion 30 further defines, at a front thereof, a pair of spring tabs 34 extending backwardly into the card receiving space 6 for abutting against the inserted electrical card. The metal shield 3 also defines an opening 31 at the junction of the flat portion 30 and the first sidewall 33, and the switch element 5 is exposed to the outside through the opening 31.

In initial state, the second spring arm 36 abuts against the rear portion 4211, the spring 41 is in normal state.

When inserting an electrical card (not labeled), the electrical card abuts against the inclined surface 406 of the slider 40, and brings the slider 40 to move. At this time, the guiding portion 404 moves in the guiding slot 16 to guide the slider 40 moving along the electrical card's insertion direction, the first fixing portion 422 moves in the heart-shaped recess 151 towards the electrical card's insertion direction.

When the electrical card is inserted into the card receiving space 6 completely, the spring 41 is compressed, and the protrusion 121 upon the spring 41 prevents the spring 41 from warping up. The first spring arm 35 pressing the rear portion 4211 of the pin member 42 and the second spring arm 36 pressing the front portion 4212 prevent the pin member 42 from jumping out of the heart-shaped recess 151.

During the whole inserting process, the rear portion 4211 from which the first fixing portion 422 movably received in the heart-shaped recess 151 bending is always alternatively pressed by the second spring arm 36 and the first spring arm 35, and thus the pin member 42 is prevented from jumping out of the heart-shaped recess 151.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
   an insulating housing;
   a plurality of terminals received in the insulating housing;
   an ejector including a slider and a pin member, the slider being moveable relative to the housing along a front-to-back direction under a controlled movement of the pin member; and
   a metal shield shielding the insulating housing to define a card receiving space and comprising a flat portion and a pair of sidewalls extending downwardly from the flat portion; wherein
   said flat portion defines a first spring arm extending rearwardly into the card receiving space and a second spring arm extending forwardly into the card receiving space for abutting against the pin member, wherein a root of the second spring arm is located in a middle area of the first spring arm.

2. The electrical card connector as described in claim 1, wherein the first spring arm and the second spring arm are substantially aligned along the front-to-back direction.

3. The electrical card connector as described in claim 1, wherein the first spring arm is wider than the second spring arm.

4. The electrical card connector as described in claim 1, wherein a free end of the second spring arm is located adjacent to a root of the first spring arm.

5. The electrical card connector as described in claim 1, wherein the insulating housing comprises a heart-shaped recess regulating a movement of the pin member.

6. The electrical card connector as described in claim 5, wherein the pin member is pivotally mounted to the slider.

7. The electrical card connector as described in claim 1, wherein the ejector comprises a spring for biasing the slider.

8. The electrical card connector as described in claim 7, wherein the insulating housing defines a base portion and a pair of the arm portions extending upwardly from the base portion, and one of the arm portions defines an upper protrusion protruding over the spring for preventing the spring from warping up.

9. The electrical card connector as described in claim 1, wherein the slider defines a base and a locking arm extending forwardly from the base.

10. The electrical card connector as described in claim 1, wherein the flat portion comprises at a front thereof a pair of spring tabs extending rearwardly into the card receiving space for abutting against an inserted card.

11. An electrical card connector for use with an electronic card, comprising:
    an insulative housing;
    a plurality of contacts disposed in the housing;
    a metallic shell assembled to the housing and cooperating with the housing to commonly define a card receiving space into which contacting sections of said contacts extend; and
    an ejection mechanism including a pin member defining a first end pivotally mounted to a slider which is moveable back and forth along a front-to-back direction between inner and outer positions so as to have said pin member also moveable back and forth in said front-to-back direction; and a second end which is moveable along a heart-shaped groove which is formed in a stationary part of the housing; wherein
    the shell defines a first spring arm abutting against the second end when said slider is moved to the inner position where the electronic card is mated with the contacts, and a second spring arm abutting against the second end when said slider is moved to the outer position where the electronic card is un-mated with the contacts, wherein said first spring arm and said second spring arm extend in opposite directions while sharing with a commonly joined portion so as to be in a co-movement manner when either one of said first spring arm and said second spring arm confronts the second end of the pin member wherein said second spring arm is split and extends from an interior portion of the first spring arm.

12. The electrical card connector as claimed in claim 11, wherein said ejection mechanism further includes a spring constantly urging the slider to move rearwardly from the inner position to the outer position.

13. The electrical card connector as claimed in claim 11, wherein the second spring arm abuts against the first end when the slider is moved to the inner position.

14. The electrical card connector as claimed in claim 11, wherein said commonly joined portion has one side linked to a root section of one of said first spring arm and said second spring arm and an opposite side linked around a free end section of the other of said first spring arm and said second spring arm around.

15. An electrical card connector for use with an electronic card, comprising:
    an insulative housing;
    a plurality of contacts disposed in the housing;

a metallic shell assembled to the housing and cooperating with the housing to commonly define a card receiving space into which contacting sections of said contacts extend; and an ejection mechanism including a pin member defining a first end pivotally mounted to a slider which is moveable back and forth along a front-to-back direction between inner and outer positions so as to have said pin member also moveable back and forth in said front-to-back direction; and a second end which is moveable along a heart-shaped groove which is formed in a stationary part of the housing; wherein the shell defines a first spring arm abutting against the second end, and a second spring arm abutting against the first end when said slider is moved to the inner position where the electronic card is mated with the contacts, wherein the first spring arm and the second spring extend in opposite direction while primarily overlapped with each other in a transverse direction perpendicular to the front-to-back direction wherein said second spring arm is split and extends from an interior portion of the first spring arm.

16. The electrical card connector as claimed in claim 15, wherein said second spring arm abuts against the second end when said slider is moved to the outer position where the electronic card is un-mated with the contacts.

17. The electrical card connector as claimed in claim 14, wherein the side of said commonly joined portion is linked to the root section of the second spring arm while the opposite side is linked around the free end section of the first spring arm.

18. The electrical card connector as claimed in claim 15, wherein said first spring arm and said second spring arm further share a commonly joined portion so as to be in a co-movement manner when either one of said first spring arm and said second spring arm confronts the second end of the pin member.

* * * * *